Feb. 27, 1940.  R. W. HAUTZENROEDER  2,192,078

TRANSMISSION

Filed July 13, 1937  4 Sheets-Sheet 1

INVENTOR.
Richard W. Hautzenroeder
BY
Pay, Oberlin & Pay
ATTORNEYS.

Feb. 27, 1940.    R. W. HAUTZENROEDER    2,192,078
TRANSMISSION
Filed July 13, 1937    4 Sheets-Sheet 2
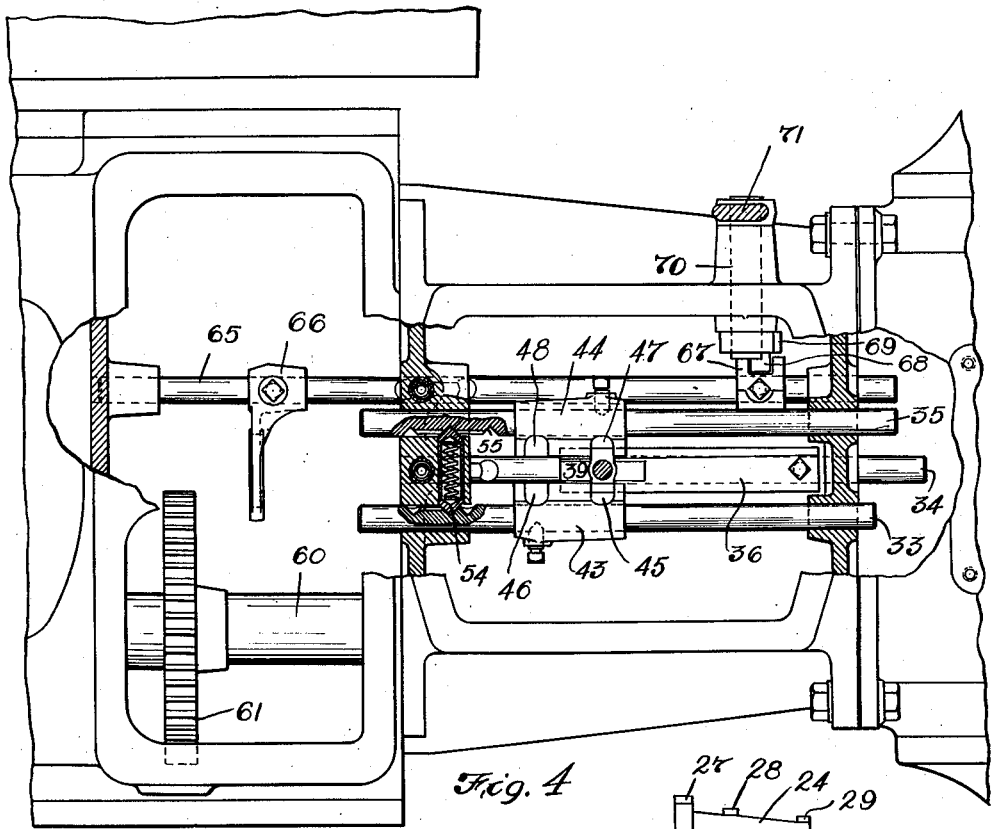
Fig. 4
Fig. 6
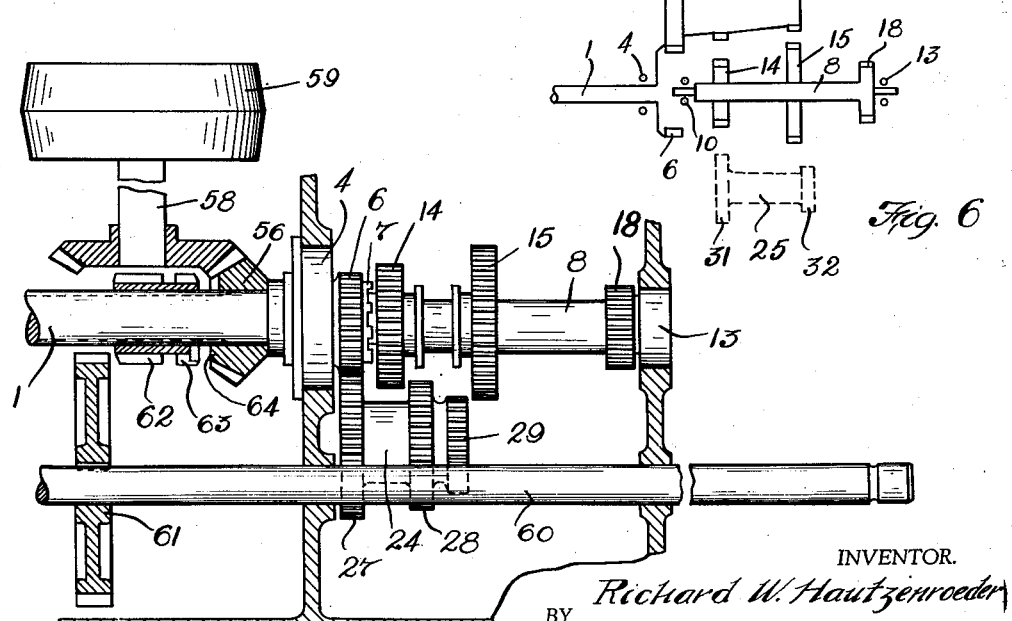
Fig. 5
INVENTOR.
Richard W. Hautzenroeder
BY
Fay, Oberlin & Fay
ATTORNEYS.

INVENTOR.
Richard W. Hautzenroeder
BY Fay, Oberlin & Fay
ATTORNEYS.

Feb. 27, 1940.                R. W. HAUTZENROEDER                2,192,078
                                   TRANSMISSION
                              Filed July 13, 1937            4 Sheets-Sheet 4

INVENTOR.
Richard W. Hautzenroeder
BY Fay, Oberlin & Fay
ATTORNEYS.

Patented Feb. 27, 1940

2,192,078

UNITED STATES PATENT OFFICE 2,192,078

TRANSMISSION

Richard W. Hautzenroeder, Mansfield, Ohio

Application July 13, 1937, Serial No. 153,303

1 Claim. (Cl. 74—333)

This invention relates as indicated to transmissions and more particularly to change-speed mechanisms commonly employed in transmitting under various speed ratios the power from a driving shaft such as the crank shaft of an internal combustion engine motor to the shaft or similar device to be driven such as the rear axles in a self-propelled vehicle.

It will be observed, however, from the ensuing description of my invention that the same is applicable for use wherever a change-speed transmission is desired and is particularly applicable for use where a wide variety of speed ratios between the driving and the driven shafts is necessary. My invention, therefore, may be employed for a wide variety of uses and as hereinafter pointed out, is not limited for use in self-propelled vehicles.

It is the principal object of my invention to provide a transmission or change-speed mechanism whereby a large number of speed ratios between the driving and driven elements is obtainable by a gearing arrangement which is extremely simple, both in construction and mode of manipulation.

It is a further object of my invention to provide a transmission mechanism whereby separate power take-offs may be controlled in a more effective manner than has been the practice in the prior art.

Other objects of my invention will appear as the description proceeds.

To the accomplishment of the foregoing and related ends, said invention, then consists of the means hereinafter fully described and particularly pointed out in the claim.

The annexed drawings and the following description set forth in detail certain mechanism embodying the invention, such disclosed means constituting, however, but one of various mechanical forms in which the principle of the invention may be used.

Figure 1:
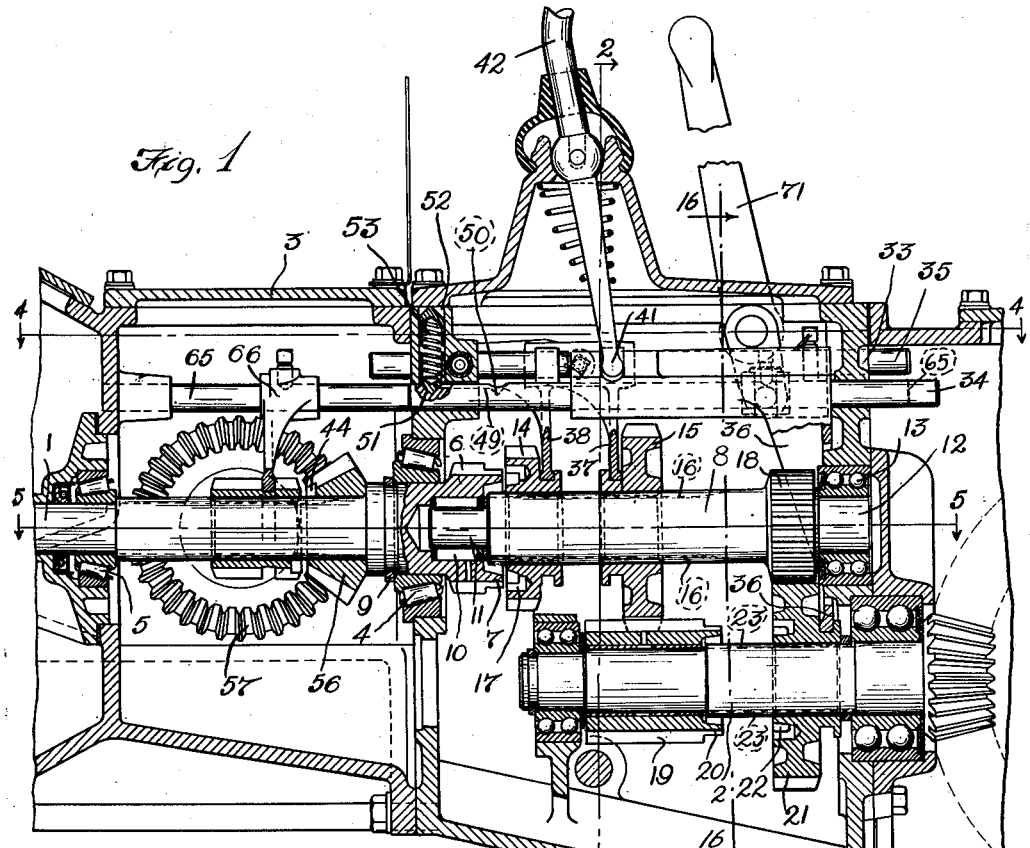
Figure 2:
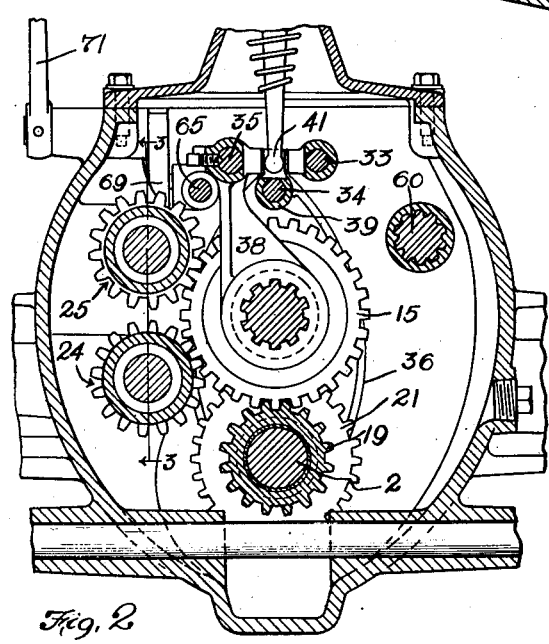
Figure 3:
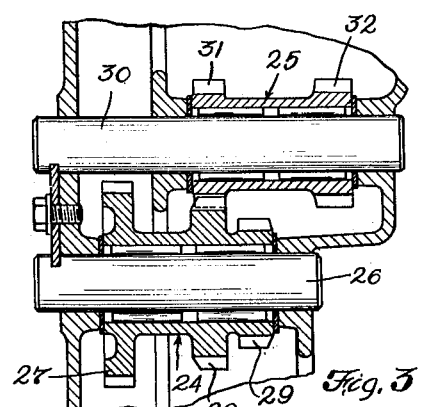
Figure 9:
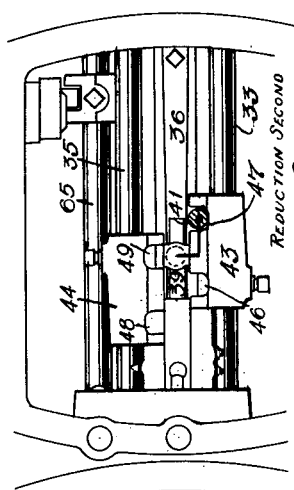
Figure 16:
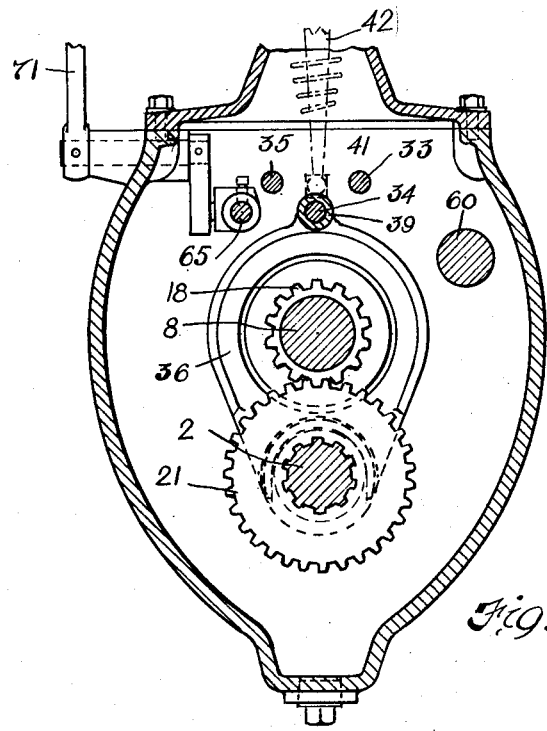
Figure 17:
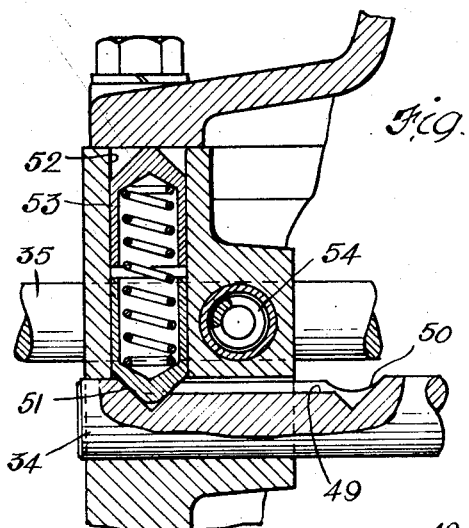
Figure 18:
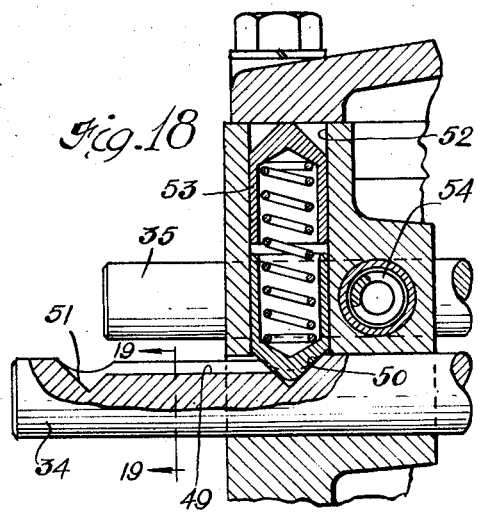
Figure 19:
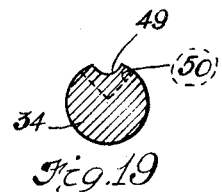

In said annexed drawings, Fig. 1 is a transverse sectional view through a transmission or change-speed mechanism constructed in accordance with the principles of my invention; Fig. 2 is a transverse sectional view of the apparatus illustrated in Fig. 1 taken on a plane substantially indicated by the line 2—2; Fig. 3 is a fragmentary scale view of the apparatus indicated in Fig. 2 taken on a plane substantially indicated by the line 3—3; Fig. 4 is a fragmentary plane view partially in section of the apparatus illustrated in Fig. 1 taken on a plane substantially indicated by the line 4—4; Fig. 5 is a fragmentary sectional view of the apparatus illustrated in Fig. 1 taken on a plane substantially indicated by the line 5—5; Fig. 6 is a diagrammatic representation of certain of the gearing which is included in the apparatus illustrated in Fig. 1; Figs. 7 to 15 respectively show different positions of certain parts of the apparatus illustrated in Figs. 1 and 4 when the change-speed mechanism is adjusted for various speed ratios and relative directions of rotation between the driving and driven elements of the transmission; Fig. 16 is a transverse sectional view of the apparatus illustrated in Fig. 1 taken on a plane substantially indicated by the line 16—16; Figures 17 and 18 are enlarged fragmentary sectional views of a portion of Fig. 1 showing particularly the construction of the detent and the manner in which it is associated with the shaft 34 to retain the same in either one of two selected positions and Fig. 19 is a transverse sectional view of a portion of the structure illustrated in Fig. 18 taken on a plane substantially indicated by the line 19—19.

Referring now more specifically to the drawings, and more especially to Fig. 1, the apparatus comprising my invention is adapted for use in varying the speed ratio and relative direction of rotation between a shaft generally indicated at 1 and which, for the purpose of convenience in describing the apparatus will be hereinafter referred to as the driving shaft.

The power shaft 1 may be connected to or driven by any suitable prime mover such as an internal combustion engine, steam engine, or dynamo electric machine and the driven shaft 2, while it is shown as being in driving communication with a conventional differential such as is associated with the rear axles of a self-propelled vehicle, may, nevertheless, be employed for the purpose of driving any other suitable device. In this connection it should be observed that my invention is particularly suitable for use in all types of heavy stationary machinery where a variety of speed ratios between the prime mover and the driven means of the machine is desired.

The gearing arrangement and its associated parts which forms the subject-matter of my invention may be conventionally housed in a gear case generally indicated at 3 which is made fluid-tight so as to be capable of being at least partially filled with a suitable lubricant. Since such gear case is more or less conventional, the following description of the apparatus comprising my invention will be limited to the essential gearing included within such case.

The power shaft 1 is journalled in axle bearings 4 and 5 which are supported in transversely extending bridge walls in the gear case 3. The power shaft 1 is provided with a gear 6 which may be either formed integrally therewith or if the gear is formed separately from the shaft, then such gear may be keyed to the shaft.

The gear 6 is provided with jaw-like projections 7 extending axially from the right face thereof as viewed in Fig. 1 for the purpose hereinafter more fully described.

In axial alignment with the power shaft 1 is a shaft 8, which, for purposes of convenience in describing this apparatus will throughout the ensuing description and in the claims be referred to as the intermediate shaft.

In a cylindrical recess 9 formed coaxially with and in the righthand end of the power shaft 1 is a friction-reducing bearing 10 which rotatably supports the reduced extension 11 of the intermediate shaft 8. The intermediate shaft 8 is rotatably supported at its other, i. e., righthand end 12, in friction reducing bearings 13 supported by the wall of the gear case 3. Slidably mounted on the intermediate shaft 8 are gears 14 and 15. These last-named gears, while slidable axially on the intermediate shaft 8 are held against rotation relative to said shaft by keys in the keyways 16. The gear 14 is on its lefthand face, as viewed in Fig. 1, provided with clutch jaw recesses 17 adapted to engage the clutch jaw protection 7 of the gear 6 so that when the gear 14 is moved into engagement with the gear 6, the jaws 7 and the recesses 17 will cooperate to cause gear 14 to be driven directly by gear 6.

The intermediate shaft 8 is provided with a gear 18, which, for convenience, may be formed integrally or if formed separately will be keyed to the shaft 8.

Loosely mounted on the driven shaft 2 is a gear 19, which is of sufficient axial extent so that the gear 15 is always in mesh therewith although the latter gear is shifted axially along the intermediate shaft 8 in effecting different adjustments of the change-speed mechanism. The right-hand end of the gear 19 is provided with axially extending clutch-jaws 20. Slidably mounted on the driven shaft 2 is a gear 21 which, on its left face, as viewed in Fig. 1, is provided with recesses adapted to engage the jaws 20 of the gear 19. The gear 21, while slidable axially on the shaft 2 is held against relative rotation with respect to such shaft by suitable keys operating in key-ways 23.

It will be observed that when the gear 21 is in the position illustrated in Fig. 1, rotation of the intermediate shaft 8 will result in a driving of the driven shaft 2 through the gears 18 and 21. If the gear 21 is moved axially to the left so as to cause clutching engagement between the gear 21 and the gear 19, then the shaft 8 will drive the shaft 2 through the gears 15, 19 and 21.

Associated with the gearing above described, is a conventional change-speed cluster generally indicated at 24 in Figs. 2 and 3 and a reverse speed cluster generally indicated at 25 in the same figures. This portion of the transmission mechanism is conventional. In other words, in the transmission which has been chosen for the purpose of illustrating the principles of my invention, no change has been made from the customary construction found in conventional three speed forward, one speed reverse transmission.

While the construction and mode of operation of this part of the transmission is well known to those familiar with the art, the following is a brief description of the same in order that this description may be complete.

The change speed cluster 24 is mounted on a shaft 26 and includes a constant mesh gear 27, an intermediate or second speed gear 28 and a low speed gear 29

The reverse cluster 25 is mounted on a shaft 30 and includes a constant mesh gear 31 and a reverse pinion 32. In order to simplify the illustration and description of the mode of operation of this gear cluster, reference may be had to Fig. 6 which, as previously indicated, is diagrammatic and does not show the exact relative positions of the parts which the same occupy in the gear case.

The diagram given in Fig. 6 is for the purpose of illustrating the manner in which the driven shaft 2 may be driven in opposite directions and at different speed ratios from the power shaft 1. High gear transmission of rotation between the shafts 1 and 8 is effected by an engagement of the gear 14 with the gear 6 through the medium of the jaw clutch elements 7 and 17. Second or intermediate speed is effected by a shifting of the gear 14 so that it meshes with the gear 28. The transmission of power from the shaft 1 to the shaft 8 for second gear is through the following train:—Gear 6, gear 27, barrel of change speed cluster 24, gear 28, gear 14, shaft 8.

Low speed transmission between shaft 1 and shaft 8 is effected by permitting the gear 14 to remain out of mesh with any of its associated gears and by moving gear 15 into mesh with gear 29. Transmission of power from shaft 1 to shaft 8 is therefore through the following train:— Gear 6, gear 27, change speed cluster barrel 24, low gear 29, gear 15, shaft 8.

When it is desired to drive the shaft 8 in a direction opposite from the direction of rotation of shaft 1, then the gear 15 will be shifted into mesh with reverse pinion 32 on the reverse cluster 25. At this point it should be noted that the standard machine gear 31 of the reverse cluster 25 is always in mesh with gear 28 on the change-speed cluster 24.

The power train for this reverse position is therefore through gear 6, gear 27, barrel of change-speed cluster 24, gear 28, gear 31, barrel of reverse cluster 25, reverse pinion 32, gear 15, shaft 8.

It will be observed that when the driven shaft 2 is driven from the intermediate shaft through the gears 18 and 21, the driven shaft 2 will rotate at a speed less than the speed of rotation of the shaft 8 when the gears 18 and 21 have the relative sizes as shown in Fig. 1. If, however, the shaft 2 is driven from the shaft 8 through gears 15 and 19, then due to the smaller relative size of the latter gear, the shaft 2 will be driven at a speed greater than the speed of rotation of the shaft 8

A shifting of the gear 21 from the position shown in Fig. 1 to a position in clutching engagement with the gear 19 results in a change in the gear ratio which when superimposed on the changes which can be effected by a shifting of the gears 14 and 15 in the manner above explained converts a conventional three speed forward, one speed reverse transmission into a six speed forward, two speed reverse transmission.

It will be observed, of course, that the same principles which I have applied to a three speed forward, one speed reverse transmission can be applied to transmissions having a different number of possible speed ratios.

The means for shifting the various gears by means of a single operating lever is likewise an important feature of my invention and will now be explained.

Slidably mounted in the bridge and end walls of the gear case 3 are three shafts respectively designated by numerals 33, 34 and 35. The shaft 34 carries the shifting yoke 36 which extends downwardly into engagement with the gear 21 so that as the shaft 34 is moved forwardly from the position which it occupies in Fig. 1, the yoke 36 carried by such shaft will move the gear 21 out of mesh with the gear 18 and into clutching engagement with the gear 19. The shaft 33 carries a yoke 37 which is in engagement with the collar on the gear 15. As the shaft 33 is moved forwardly from the position it occupies in Fig. 1, carrying the gear 15 forwardly therewith, the transmission will be adjusted to either reduction or over-drive low gear as hereinafter more fully explained and when the shaft 33 is moved to the rear from the position it occupies in Fig. 1, carrying the gear 15 rearwardly from its neutral position as shown in Fig. 1, then the transmission will be adjusted to either over-drive reverse or reduction reverse as hereinafter more fully explained.

The shaft 35 carries a yoke 38 which is in engagement with the collar of the gear 14. As the shaft 35 is moved forwardly, from the position it occupies in Fig. 1, it will through the yoke 38 move the gear 14 into clutching engagement with the gear 6 and adjust the transmission for either reduction high or over-drive high as hereinafter explained and when the shaft 35 is moved to the rear from the neutral position illustrated in Fig. 1 it will carry the gear 14 out of its neutral position into mesh with gear 28 adjusting the transmission for either over-drive second or reduction second as the case may be, as hereinafter explained.

The shaft 34 is provided with a shifting block gate 39 which extends upwardly and is provided with a recess for the reception of the lower end 41 of the gear shift lever 42. The shafts 33 and 35 are provided with shifting blocks 43 and 44 respectively. Each of these shifting blocks is provided with spaced recesses 45 and 46 and 47 and 448 respectively, these recesses accommodating the lower end 41 of the gear shift lever when such lever is moved out of the neutral position preparatory to shifting one or the other of the blocks 3 and 44. The spacing of the recesses in the blocks 43 and 44 is equal to the throw of shaft 34 in moving from the reduction position to the overdrive position.

In order to secure the shaft 34 in the position to which it has been shifted by the gear shift lever, such shaft is provided with a longitudinally extending groove 49, which groove has depressions 50 and 51 therein at longitudinally spaced points. The bridge wall gear case 3 adjacent the shaft 34 is provided with a vertically extending recess 52 in which is mounted a cartridge 53. This cartridge consists of two hollow cylindrical members urged apart by means of a spring and the ends of which cylindrical members are tapered to fit into the groove 49, and the notches 50 and 51. These cylindrical members are of such length that when the two members are moved into engagement with one another, the tapered end of the lower cylindrical member may ride up out of the notches 50 or 51 but not out of the groove 49; thus the cartridge 53 not only serves as a means for holding the shaft 34 against unintended axial movement by engagement of the cartridge with the notches but also prevents rotation of the shaft 34 by the fact that the lower end of the cartridge is always in the groove 49.

The strength of the spring in the cartridge 53 is such that the operator may, by manual movement of the lever 42, cause the shaft 34 to move axially by forcing the pointed lower end of the cartridge out of the notch 51 or 50.

A cartridge 54 generally similar to cartridge 53 is mounted in a transversely extending bore in the bridge wall of the gear case between the shafts 33 and 35. These shafts are provided with a plurality of notches such as 55 joined by a longitudinally extending groove on each of the shafts. The amount of clearance between the two tubular sections of the cartridge 54, when the parts are in the position illustrated, for example, in Fig. 4, is such that one or the other of the tubular sections may move out of the notch in which it is positioned and through the connecting groove onto the next notch in the same shaft. The clearance between the two tubular sections is not sufficient, however, to permit both sections thereof to at the same time move out of the notches on the respective shafts with which they are in engagement and in this manner simultaneous movement of both shafts 33 and 35 is prevented. This is necessary in order that the operator may move only one shaft or the other at any one time because otherwise it might be possible, for him to throw in mesh two trains of gears having different speed ratios and accordingly strip the gears of one or both such trains.

The distance from the bottom of a notch on one shaft, for example 33, to the bottom of the connecting groove between the notches on the other shaft, is only very slightly greater than the length of the cartridge 54 when the cylindrical sections thereof are compressed into engagement with each other. Thus, the cartridge 54 serves the additional function of securing the shafts 33 and 35 against rotation.

As previously indicated, I also provide in my improved transmission mechanism an improved control over the driving means for the rear and side power take-offs which are usually employed in conjunction with transmissions of this character, especially when employed on self-propelled vehicles such as tractors and the like.

The construction and operation of the power take-off means and the manner of its control will now be described:—

The power shaft 1 has a bevel pinion 56 loosely mounted thereon. This bevel pinion is in mesh with a bevel gear 57 carried by a shaft 58 extending laterally out of the gear case 3 and terminally carrying a pulley or side power take-off device 59. Extending in parallel relationship with the power shaft 1 and rearwardly thereof, as most clearly illustrated in Fig. 5, is a rear power take-off shaft 60 which is journalled in suitable bearings in the bridge walls of the gear case. Keyed to the shaft 60 is a gear 61.

Slidably keyed to the power shaft 1 is a gear 62, which on its righthand end, as viewed in Figs. 1 and 5, is provided with clutch jaws 63 adapted to engage complimentary jaws 64 on the gear 56.

Slidably mounted in the gear case above the power shaft 1 and extending rearwardly therefrom is a shaft 65. This shaft 65 carries a shifting yoke 66 which extends downwardly into engagement with the gear 62 and by which the latter gear may be moved either into clutching engagement with the gear 56 or into mesh with the gear 61.

Likewise secured to the shaft 65 at a point rearwardly from the shifting yoke 66 is a shifting block 67. The shifting block 67 is engaged by pins 68 carried by depending arm 69, the latter being secured to the inside end of a shaft 70 which extends out through the side of the gear case and on the outside end of which there is secured a handle 71. Movement of the handle 71 forwardly from the position in which the same is shown in Fig. 1 will cause the gear 62 to be move into clutching engagement with the gear 56 and movement of such handle 71 rearwardly from the position shown in Fig. 1 will cause the shaft 65 to move forwardly, moving the gear 62 into mesh with the gear 61.

The operation of shifting the gears of my improved transmission and by which selection of six speeds forward and two speeds reverse is made available will now be described by having reference to Figs. 1, 5, 6 and 7 to 15.

It will be observed that with my improved transmission the setting of the center gate, i. e., the shaft 34, whether in the rearmost position with the gears 18 and 21 in mesh or in the forward position with the gears 19 and 21 clutched together, determines whether the gear ratios selected by manipulation of the gear shift lever from such position of the center gate will be an over-drive or reduction ratio.

Stating it another way, my improved transmission has in effect two high gear ratios, two intermediate or second gear ratios, two low gear ratios and two reverse gear ratios.

Figures 7 to 15 indicate the position of the center guide 39 and the shifting blocks 33 and 34 for the various possible speed ratios as above defined. For example, when it is desired to operate the transmission in reduction low, the center gate 39 will be moved to the rear or retained in the position illustrated in Fig. 1. The lower end 41 of the gear shift lever 42 will then be moved over into the notch 47 and then the block 44 moved forwardly carrying the gear 15 into mesh with the gear 29. The power train through the transmission is then as follows:

Power shaft 1, gear 6, gear 27, barrel 24, gear 29, gear 15, shaft 8, gear 18, gear 21, shaft 2.

If the transmission is to be operated at reduction reverse then with the center gate in the rear position, the lower end of the gear shift handle will be moved into engagement with the block 44 moving the same to the rear and in this way moving the gear 15 into mesh with the reverse pinion 32. The power trains of the mechanism will, therefore, be as follows:

Shaft 1, gear 6, gear 27, barrel 24, gear 28, gear 31, barrel 25, gear 32, gear 15, shaft 8, gear 18, gear 21, shaft 2.

If it is desired to operate the transmission in reduction second, the center gate 39 will be retained in the rear position and the lower end of the gear shift lever moved into engagement with the block 43 and the latter moved to the rear, this resulting in a movement of the gear 14 into mesh with the gear 28. The power train for the mechanism for this setting is as follows:

Shaft 1, gear 6, gear 27, barrel 24, gear 28, gear 14, shaft 8, gear 18, gear 21, shaft 2.

If the transmission is to be operated at reduction high gear ratio the center gate 39 will be retained in its rearward position and the lower end of the gear shift lever moved into engagement with the block 43 and the latter moved forwardly to cause the gear 14 to be clutched to the gear 6.

The power train through the transmission will, therefore, be shaft 1, gear 6, gear 14, shaft 8, gear 18, gear 21, shaft 2.

Figure 12:
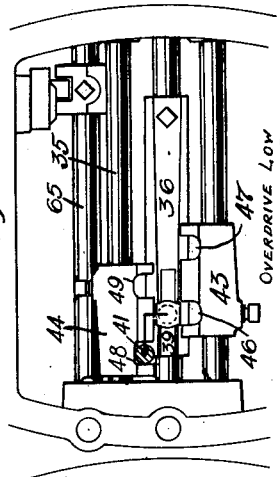
Figure 15:
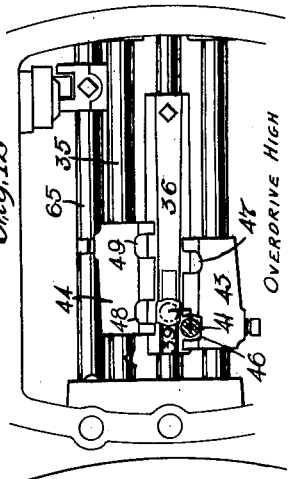
Figure 8:
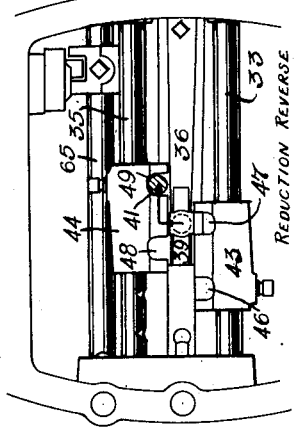

If the operator wishes to move the transmission into over-drive adjustment so that the various gear ratios selected from such position will be higher in each instance than those resulting from the gear selections just explained, he will, while the gear shift lever 42 is in neutral, pull back on the upper end of such gear shift lever. This will cause the lower end to move the center gate 39 on the shaft 34 forwardly. This will carry the yoke 36 forwardly and the yoke 36 will move the gear 21 out of mesh with the gear 18 and into clutching engagement with the gear 19. The operator has then established a new neutral position from which the over-drive or intermediate or second and low and reverse may be selected in the following manner:

Fig. 12 shows the position of the shifting blocks and center gate for over-drive low. In moving to over-drive low, the lower end of the gear shift lever is moved into notch 48 and then forwardly so that the gear 15 is moved into mesh with gear 29. The power train for the transmission will under this setting be as follows:

Shaft 1, gear 6, gear 27, barrel 24, gear 29, gear 15, gear 19, gear 21, shaft 2.

For this setting it will be observed that the intermediate shaft 8 is not carrying any torsional load. This is due to the fact that gear 15 is arranged so that it directly transmits the power from the cluster 24 to the gear 19, gear 21, shaft 2.

If it is desired to operate the transmission in overdrive reverse, the lower end of the gear shift lever, while in notch 48, will be moved to the rear moving the block 44 to the rear causing the gear 15 to be moved into mesh with the gear 32.

The power train through the transmission for this adjustment of the gears will be as follows:

Shaft 1, gear 6, gear 27, barrel 24, gear 28, gear 31, barrel 25, gear 32, gear 15, gear 19, gear 21, shaft 2.

Here again, no power is carried by intermediate shaft 8 since the gear 15 transmits the power directly from the reverse speed cluster to the gear on the driven shaft 2.

Figure 11:
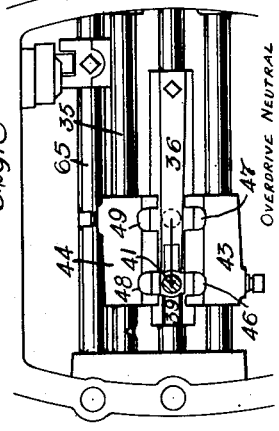
Figure 14:
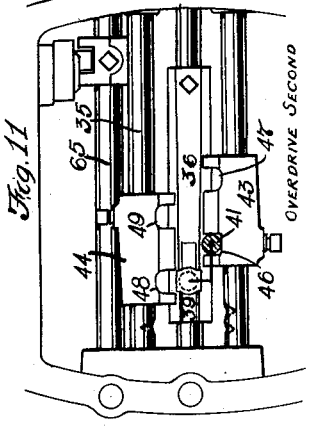
Figure 7:
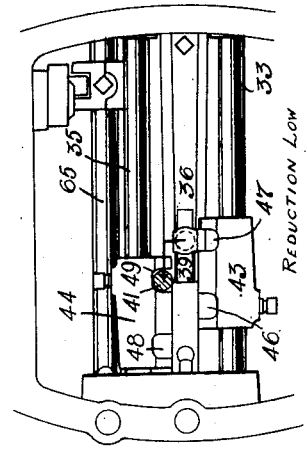
Figure 10:
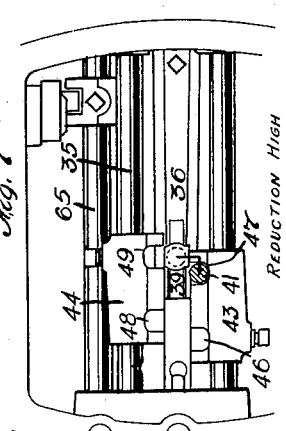
Figure 13:
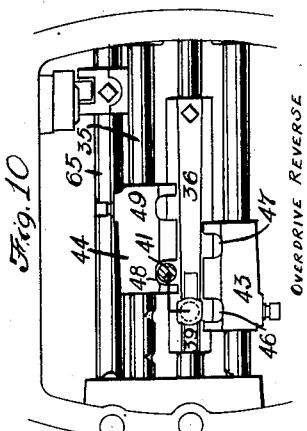

For operation of the transmission in over-drive second, the lower end of the gear shift lever will be moved from the position shown in Fig. 11 into the notch 46 and thereafter the block 43 moved to the rear causing the gear 14 to be moved into mesh with the gear 28.

The lower train through the transmission for this setting of the gears is as follows:

Shaft 1, gear 6, gear 27, barrel 24, gear 28, gear 14, shaft 8, gear 15, gear 19, gear 21, shaft 2.

If the transmission is to be operated at over-drive high, the operator will move the lower end of the gear shift lever from the over-drive neutral position illustrated in Fig. 11 into the notch 46 and then move the block 43 forwardly causing the gear 14 to be clutched to the gear 6. The power train through the transmission will then be as follows:

Shaft 1, gear 6, gear 14, shaft 8, gear 15, gear 19, gear 21, shaft 2.

Since the shifting of the gear 21 either into mesh with the gear 18 or into clutching engagement with the gear 19 multiplies by 2 the number of possible speed ratios which may be secured, it will be evident that the application of this principle to a four speed forward, one speed reverse transmission will result in the production of an eight speed forward two speed reverse transmission without modifying the principles of my invention. Similarly, other variations in other types of transmissions may be made without departing from the principles of my invention.

The arrangement of the gearing by which the power take-offs are driven is likewise believed to be a consequential improvement over the prior art since it enables the operator using my apparatus to selectively drive either power take-off without driving the other. This is believed to be an important improvement since it is undesirable in many cases when utilizing one power take-off to have the other driven since the same many times offers a serious hazard to the operator.

Other modes of applying the principle of my invention may be employed instead of the one explained, change being made as regards the mechanism herein disclosed, provided the means stated by the following claim or the equivalent of such stated means be employed.

I, therefore, particularly point out and distinctly claim as my invention:

In a transmission mechanism, the combination of a power shaft, an intermediate shaft, a driven shaft, a change speed mechanism including a gear slidably mounted on said intermediate shaft for driving said intermediate shaft at different speed ratios and in opposite directions from said power shaft, a gear loosely mounted on said driven shaft and in mesh with said slidably mounted gear, a pinion fixed on said intermediate shaft, and a gear slidably keyed to said driven shaft, said last-named gear selectively movable either into mesh with said pinion or into clutching engagement with the other gear on said driven shaft.

RICHARD W. HAUTZENROEDER.